US012296924B1

(12) United States Patent
Hartman (10) Patent No.: US 12,296,924 B1
(45) Date of Patent: *May 13, 2025

(54) WAKEBOAT DRAFT MEASURING SYSTEM AND METHODS

(71) Applicant: SKIER'S CHOICE, INC., Maryville, TN (US)

(72) Inventor: Richard L. Hartman, Rathdrum, ID (US)

(73) Assignee: Skier's Choice, Inc., Maryville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,890

(22) Filed: Jun. 16, 2023

Related U.S. Application Data

(63) Continuation of application No. 17/181,415, filed on Feb. 22, 2021, now Pat. No. 11,679,847, which is a continuation of application No. 16/572,204, filed on Sep. 16, 2019, now Pat. No. 10,926,848, which is a continuation of application No. 15/876,614, filed on Jan. 22, 2018, now Pat. No. 10,414,470, which is a continuation of application No. 15/219,431, filed on Jul. 26, 2016, now Pat. No. 9,873,491.

(60) Provisional application No. 62/201,030, filed on Aug. 4, 2015.

(51) Int. Cl.
*B63B 1/32* (2006.01)
*B63B 1/28* (2006.01)
*B63B 32/70* (2020.01)
*B63B 34/70* (2020.01)
*B63B 39/12* (2006.01)
*G01C 13/00* (2006.01)

(52) U.S. Cl.
CPC ............ *B63B 1/32* (2013.01); *B63B 1/286* (2013.01); *B63B 32/70* (2020.02); *B63B 34/70* (2020.02); *B63B 39/12* (2013.01); *G01C 13/002* (2013.01)

(58) Field of Classification Search
CPC .. B63B 1/00; B63B 1/286; B63B 1/32; B63B 34/00; B63B 34/70; B63B 32/00; B63B 32/70; B63B 39/00; B63B 39/12; G01C 13/00; G01C 13/002
USPC ......................................................... 114/285
See application file for complete search history.

(56) References Cited

U.S. PATENT DOCUMENTS

| 9,873,491 | B2 * | 1/2018 | Hartman | ................ B63B 39/12 |
| 10,414,470 | B1 * | 9/2019 | Hartman | ................ B63B 39/12 |
| 10,926,848 | B1 * | 2/2021 | Hartman | ................ B63B 39/12 |
| 11,679,847 | B1 * | 6/2023 | Hartman | ................ B63B 39/12 114/285 |

* cited by examiner

*Primary Examiner* — Lars A Olson (74) *Attorney, Agent, or Firm* — McAfee & Taft (57) ABSTRACT

Wakeboat hull control systems and methods are provided to permit the accurate reproduction of a wake behind a wakeboat. The onboard wake control system receives data from a draft measuring system. Incorporation of the data from the draft measuring system permits accurate reproduction of a wake behind the wakeboat after a change in an onboard variable such as the number, weight or position of passengers, the weight or position of cargo and the position of trim tabs or amount/location of ballast.

28 Claims, 9 Drawing Sheets

WAKEBOAT DRAFT MEASURING SYSTEM AND METHODS

CROSS REFERENCE TO RELATED APPLICATIONS

This application is a continuation of U.S. application Ser. No. 17/181,415 filed Feb. 22, 2021, now U.S. Pat. No. 11,679,847, which is a continuation of U.S. application Ser. No. 16/572,204 filed Sep. 16, 2019 now U.S. Pat. No. 10,926,848, which is a continuation of U.S. application Ser. No. 15/876,614 filed Jan. 22, 2018 now U.S. Pat. No. 10,414,470, which is a continuation of U.S. application Ser. No. 15/219,431 filed Jul. 26, 2016, now U.S. Pat. No. 9,873,491, issued Jan. 23, 2018, which claims the benefit of previously filed U.S. Provisional Application Ser. No. 62/201,030 filed on Aug. 4, 2015.

BACKGROUND

Watersports involving powered watercraft have enjoyed a long history. Recently, watersports have emerged which are conducted in the intentionally enhanced wake of a watercraft. Such pursuits are collectively referred to as "wakesports" and include wakeboarding, wakesurfing, and wakeskating. The specialized boats used to create the enhanced wakes associated with wakesports are referred to in the industry as "wakeboats".

Wakeboats create their enhanced wakes using a variety of techniques. The primary cause of a boat's wake is the displacement of water by its hull. Changes to the hull's orientation in the surrounding water directly affect the size, shape, and perceived quality of the resulting wake. As wakesports have become more popular, many different techniques have been developed to alter the orientation of a wakeboat's hull in the water and thus change the nature of the wake it produces.

When optimizing the wake for a particular watersports participant, and especially when seeking to reproduce wake conditions achieved at some time in the past, the entire relationship between the hull and the body of water in which it is moving must be taken into account. As noted above, the behavior of the wake is primarily controlled by how the hull displaces the water, which is in turn controlled by the draft and angles of the wakeboat hull in the water. When a preferred wake has been achieved through careful arrangement of such factors as ballast amounts and trim tab settings, it is very desirable to "store" the hull conditions which resulted in the preferred wake behavior. Ideally, the same preferred wake could then be reproduced by recalling the stored conditions and duplicating them.

Some existing wake enhancement systems attempt to provide such a "store and recall" feature. One common approach is to remember the amount of ballast in various ballast chambers situated around the boat, on the premise that if the same amount of ballast is later restored to those compartments the attitude of the hull will be duplicated and the preferred wake duplicated as well.

The reality is not so simple. Hull attitude is affected by many factors beyond just ballast amounts, including but in no way limited to the amount of fuel onboard, the amount of equipment onboard, the number of passengers onboard, and the relative weight and positioning of all of these variables. Worse, these factors can and do change in real time such as when passengers embark and disembark or move around within the wakeboat, or fuel is consumed or refilled during a day's operation.

Compounding these realities is the fact that boating in general, and watersports in particular, are often very social events. Passengers come and go during a single outing. Even changing the current watersport participant (say, from a heavier to a lighter wakeboarder) alters the amount and distribution of weight in the hull. All of this may involve small children to large adults. These very natural occurrences cause multi-hundred pound changes in weight distribution, corresponding substantial changes in hull angles and draft, and thus significant variability in the wake produced.

Wake control systems flatly ignore such changes and the effects they have on hull orientation. By relying on the fiction that identical ballast and trim tab settings will yield an identical relationship between hull and water, they fail to measure and/or accommodate for the substantial effects of day to day, and sometimes minute to minute, changes in equipment and passengers on board the wakeboat. These deficiencies can lead to significant frustration of wakeboat owners, angry customer service calls to wakeboat dealers, and damage to the reputation of wakeboat manufacturers.

More recently, advanced wake control systems have finally recognized the need to measure and control the actual hull of the wakeboat. Instead of mistakenly focusing on accessories such as ballast and trim tabs, these advanced systems measure the actual relationship of the hull to the surrounding water and then adjust the ballast, trim tabs, and other accessories to restore the hull to the same conditions. One such system is described in U.S. Pat. No. 8,798,825 issued Aug. 5, 2014, the entirety of which is incorporated by reference herein.

SUMMARY OF THE DISCLOSURE

Disclosed herein is a wake control system for use on a wakeboat. The system comprises a wakeboat having a hull, at least one trim tab attached to the wakeboat, at least one ballast tank carried by the wakeboat and an onboard wake control system suitable for controlling the position of the trim tab and fluid levels within the ballast tank. The onboard wake control system including memory sufficient to store data associate with the position of the trim tab and fluid level within the ballast tank. The hull of the wakeboat has a hole positioned below the operational water line. Positioned within the hold is a fitting and attached to the fitting is an open pipe providing fluid communication between the exterior and interior of the hull. The pipe carries a draft measuring system capable of generating a signal representative of a wake profile of the hull within the water. The signal generated by the draft measuring system is received and stored within the wake control system.

Also disclosed herein is a method for accurately reproducing a wake behind a wakeboat. The method comprises the steps of providing a wakeboat having a hull fitted with a draft measuring system. The wakeboat further includes at least one trim tab and at least one ballast tank controlled by an onboard wake control system. A first wake is established behind the wakeboat. Upon establishing the desired wake, the draft of the hull is measured by the use of a draft measuring system. The draft measuring system then transmits a signal representative of the draft of the hull to the onboard wake control system which stores the value of the measured draft. Subsequently, changes are made in common variables on the wakeboat, including but not limited to, number of passengers on the wakeboat, position of the passengers on the wakeboat, weight of all passengers on the wakeboat, weight of cargo and/or position of cargo on the wakeboat, the angle of the at least one trim tab and/or the fluid level within the at least one ballast tank. Following the change in the one or more variables, the use of the draft measuring system and wake control system will reproduce the stored first wake.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

One of the important parameters associated with the hull's relationship to the surrounding water is its depth in that water. The proper term for that measurement is "nautical draft" or just "draft", which differentiates it from the depth of the water itself (from the water's surface to the "land" lying beneath the body of water). Draft is one of the significant degrees of freedom for a hull, and any wake control system which seeks to measure and manage the hull of its wakeboat must measure and manage draft.

A simply scenario will serve to illustrate the importance of draft to a wakeboat and wakesports. On a given day, suppose that a wakeboat has one wakesports participant in the wake behind the boat and three adult passengers onboard watching and/or coaching. The participant likes the wake configuration and asks that it be stored in memory by the boat's wake control system for recall in the future.

On a subsequent day, the same wakesports participant now has six adult passengers onboard instead of three. The previously stored wake configuration is recalled, which causes duplication of the ballast amounts, trim tab angles, hull speed, and other factors. However, despite the representation of the wake control system that the stored conditions have been reproduced, the truth is quite different. In fact, the hull's conditions have not been reproduced: There are three more adult passengers in the boat than when the parameters were originally stored. If those passengers average 160 pounds each, they have added 480 pounds.

This additional weight will cause the hull to sink lower into the surrounding water. In nautical terms, the watercraft's draft will increase as the hull increases its wetted surface to achieve equilibrium with its increased load. As previously explained, the behavior of the wake is primarily controlled by how the hull displaces the water—and now the hull is displacing significantly more water due to the increased weight of the additional passengers. Just three passengers represent nearly 500 pounds—a very large weight change in the context of wakesports, one that will have a very dramatic effect on the nature and quality of the wake produced behind the wakeboat.

It is clear that to restore a previous wake configuration, a wake control system must compensate for changes such as different passenger load. A modern, proper, and advanced wake control system would adjust the ballast or trim tab angles based on actual hull measurements and change the amount of ballast or angles of trim tabs—not to make them equal with some previous values (by mistakenly focusing on hull accessories), but to put the hull back where it belongs (by properly focusing on the hull itself).

In the scenario above, restoring the hull's former buoyancy would require a reduction in ballast to offset the additional weight of the three extra passengers. Sometimes changes may require more ballast or trim tab angles; other times they may require less. What matters is the hull, not the accessories.

Therefore, to actually duplicate an earlier wake, a proper wake control system must measure what the hull is actually doing. As is clear from the description above, measuring ballast amounts or trim tab angles or other secondary characteristics does not capture all of the factors affecting the hull. Even manually entering passenger count, or weight, or seating arrangement, is insufficient because passengers are not the only variable. The hull is what matters. The hull itself must be measured, and as the preceding example proves, the hull's depth in the water—its draft—is an important component of both measuring a hull and restoring that hull to the same relationship with the surrounding water.

The purpose of a nautical draft sensor is to measure the depth of a watercraft's hull in the surrounding water; i.e. how "deep" the hull sinks into the water at any given time. Generally speaking, a primary purpose of a watercraft's hull is to keep the water on the outside of the boat. This puts the hull at odds with the desire to measure the hull's depth in the water, because under most circumstances the hull intentionally isolates equipment, including sensors that are within the hull from the water outside of the hull.

Embodiments of the present disclosure rely on the behavior of water to "seek its own level". The present disclosure provides draft measuring systems that measure the water level—and thus the hull's draft—from within the hull without directly contacting the water itself and transmit a signal representative of the measured draft to an onboard wake control system. The results include significant advantages of safety, reliability, and flexibility of sensor design and installation.

Figure 1:
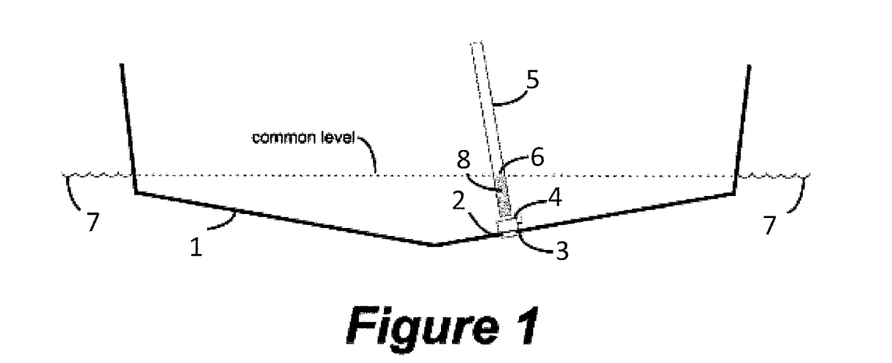
FIG. 1 is a cutaway view of the hull of a watercraft illustrating how one embodiment of the present disclosure makes the level of the water surrounding the hull available for measurement within the hull.

FIG. 1 illustrates one portion of a watercraft hull. Hull 1 is of a V-shaped design, one of many popular styles used in the marine industry. The use of a V-shaped hull in FIG. 1 is for convenience and not intended to limit the applicability of the present disclosure, which is compatible with virtually any style or shape of hull.

Continuing with FIG. 1, hull 1 is provided with an opening 2 in which a fitting 3 is installed. Fitting 3 may be, for example, a "mushroom" style such as a THMR1.000-B that protrudes beyond the natural hull profile (Marine Hardware, 14560 NE 9151 Street, Redmond, WA 98052); a "seacock" style such as a SEAC1.000-B that contains an integrated valve (Marine Hardware, same); a "flush mount"

style that does not disrupt the natural provide of the exterior of the hull such as a 0331 006PLB (Perk Inc., 16490 NW 131 Avenue, Miami, FL 33169); or another style whose characteristics suit the specific application.

If the selected fitting does not include an integrated shutoff, a valve 4 such as a BVLV1.000-FPHL (Marine Hardware, 14560 NE 91st Street, Redmond WA 98052), or another valve whose characteristics suit the specific application, may be included as a safety measure to permit closure of the hull opening if necessary.

In some embodiments of the present disclosure, the bottom of a pipe 5 is attached to the top of fitting 3 (or valve 4, if present) as shown. The top of pipe 5 is open to the ambient environment. When valve 4 is either absent or open, water is able to flow in and out of pipe 5 through fitting 3. Due to the well known behavior of water to "seek its own level", the level 6 of the water in pipe 5 will seek the same level as the level 7 of the water outside of hull 1. For clarity, the dashed line labeled "common level" in FIG. 1 highlights this relationship between the water levels inside and outside of the hull.

This coordination of levels will continue even as the level 7 of the water outside of hull 1 changes. As hull 1 sits or moves deeper in the surrounding water, the outside water level 7 will rise and the level 6 of the water in pipe 5 will rise accordingly. Likewise, as hull 1 rises or moves shallower in the surrounding water, the outside water level 7 will fall and the level 6 of the water in pipe 5 will drop accordingly.

FIG. 1 illustrates pipe 5 at an angle due to the angle of hull 1. The hydraulic behavior of the water level in pipe 5 is tolerant of significant angles and in most cases there is no need to "straighten" pipe 5 towards vertical. One advantageous benefit of this characteristic is that the present disclosure is operable even if hull 1 is tilted at a significant angle during watercraft operation, a condition commonly encountered while engaged in wakesports activities. However, if suitable for a specific application, an angularly articulated fitting could be used between fitting 3, valve 4, and/or pipe 5 to orient pipe 5 as desired to permit repositioning and/or reorientation of pipe 5 from that otherwise imposed by opening 2 or hull 1.

This portion of the present invention can combine economical components familiar to the marine industry to make the surrounding water level available within the hull of a watercraft, in the form of a water column 8 whose height is directly proportional to the draft of the watercraft's hull. Measuring the height of water column 8 within the hull then indicates the "depth", or draft, of the hull in the surrounding water.

The following disclosures of the present invention present many techniques for measuring the height of water column 8.

Figure 2:
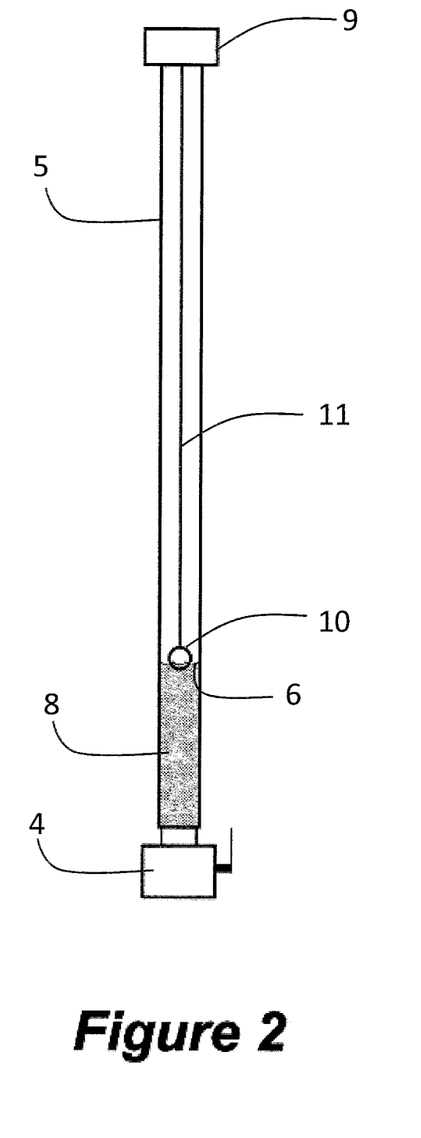
FIG. 2 illustrates one embodiment of the present disclosure depicting mechanical measurement of hull draft.

For convenience, FIG. 2 uses a vertical orientation (though, as noted above, such an orientation is not required). Optional valve 4 is again connected to pipe 5, in which water column 8 rises and falls with the draft of the hull as described above.

In some embodiments, the present disclosure comprises a float mechanism 9 that directly measures the height of water column 8. A buoyant float 10 attached to float mechanism 9 via mechanical connection 11 sits on the surface 6 of water column 8. As the top surface of water column 8 rises and falls, so too does float 10, which communicates such physical changes to float mechanism 9 via connection 11. Float mechanism 9 converts the level of float 10 to an output signal.

While embodiments based on FIG. 2 are functional, improvements are possible. For example, in FIG. 2 at least some portion of the sensor components are in direct contact with the water being measured. This may expose the sensor to debris or corrosion, especially in a salt water environment, and thus require maintenance.

It would be a further advancement of the art to measure the draft of the hull while keeping the sensor entirely out of contact with the water being measured.

Figure 3:
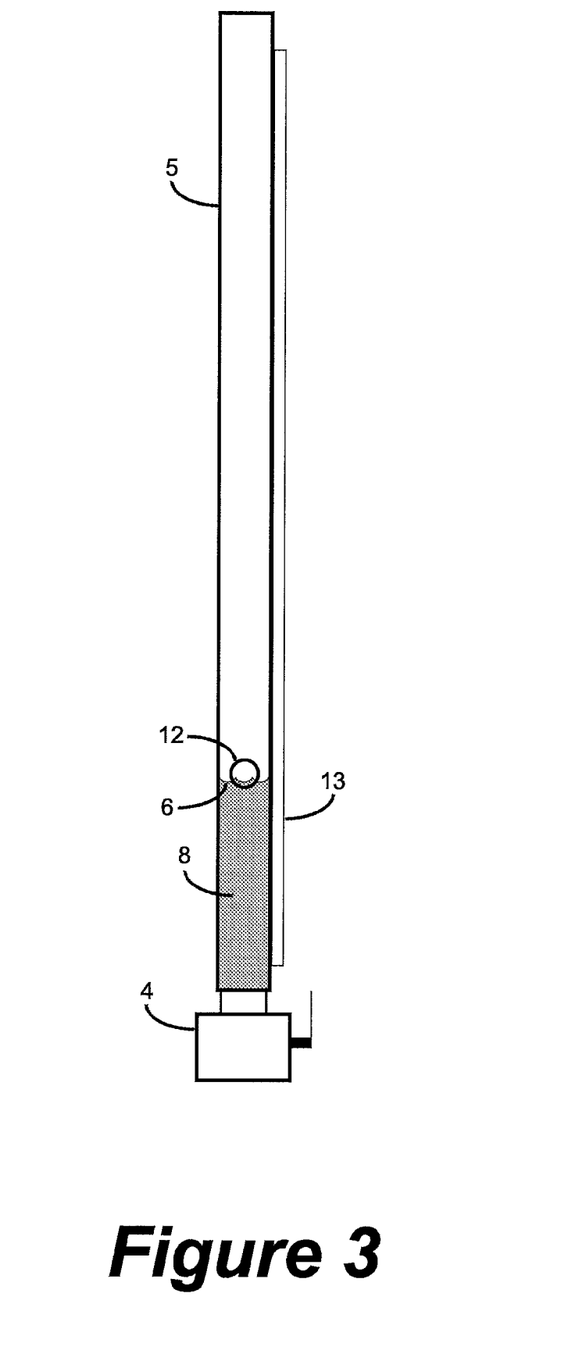
FIG. 3 illustrates one embodiment of the present disclosure depicting optical measurement of hull draft.

FIG. 3 illustrates one such embodiment of the present disclosure. In this embodiment, pipe 5 is comprised of a generally optically transparent material such as clear polyvinyl chloride, popularly known as PVC (product number 34134 from United States Plastic Corporation, 1390 Neubrecht Road, Lima OH 45801) or another material whose characteristics suit the specific application.

In some embodiments, a buoyant float 12 sits on the surface 6 of water column 8, but is otherwise allowed to move freely within, and requires no connection to anything outside of, pipe 5. Constrictions at the ends of pipe 5 retain float 12 from exiting pipe 5.

Continuing with FIG. 3, an optical sensor 13 is attached to the outside of pipe 5. In some embodiments, optical sensor 13 operates on the principle of transmission: One or more optical emitters, such as light emitting diodes, transmit light through pipe 5 and the air or water within and the light is sensed on the opposite side of pipe 5 by one or more light-sensitive, wavelength compatible receptors such as photodiodes or phototransistors. In other embodiments, optical sensor 13 operates on the principle of reflection: One or more optical emitters transmit light into pipe 5 and the reflection of the light is sensed on the same side of pipe 5 by one or more light-sensitive, wavelength compatible receptors.

Optical sensor 13 may comprise, for example, an array of integrated sensors such as the IS31SE5000 (Integrated Silicon Solution Incorporated, 1623 Buckeye Drive, Milpitas CA 95035) or another sensor whose characteristics suit the specific application, together with supporting circuitry.

In some embodiments, optical sensor 13 is able to sense the presence or absence of water directly, by detecting changes in color or refraction or another figure of merit. As the height of water column 8 varies, optical sensor 13 directly detects its top surface and converts its position to an output signal.

In other embodiments, float 12 is optically compatible with optical sensor 13 and pipe 5 such that optical sensor 13 can detect the position of float 12 through pipe 5 via float 12's opaqueness (in a transmissive embodiment) or reflectivity (in a reflective embodiment). As the height of water column 8 varies, the position of float 12 varies with it. Optical sensor 13 detects the position of float 12 and converts that position to an output signal.

The embodiment of the present disclosure shown in FIG. 3 is a significant improvement upon that shown in FIG. 2. The embodiment of FIG. 3 isolates the water column 8 from optical sensor 13 on the outside of pipe 5. The sensor is thus not exposed to debris, contamination, or corrosion. The sensor also need not be tolerant of submersion, an enormous advantage which yields benefits in economy and manufacturing.

Another improvement delivered by some embodiments of the present disclosure accommodates the realities of open water. The water surrounding the hull of a watercraft is often not calm, with undulations and disturbances that cause the hull to rock and shift. Such movements do not represent changes in the average hull draft, but nevertheless can cause the height of water column 8 in pipe 5 to oscillate around the average hull draft.

Figure 4:
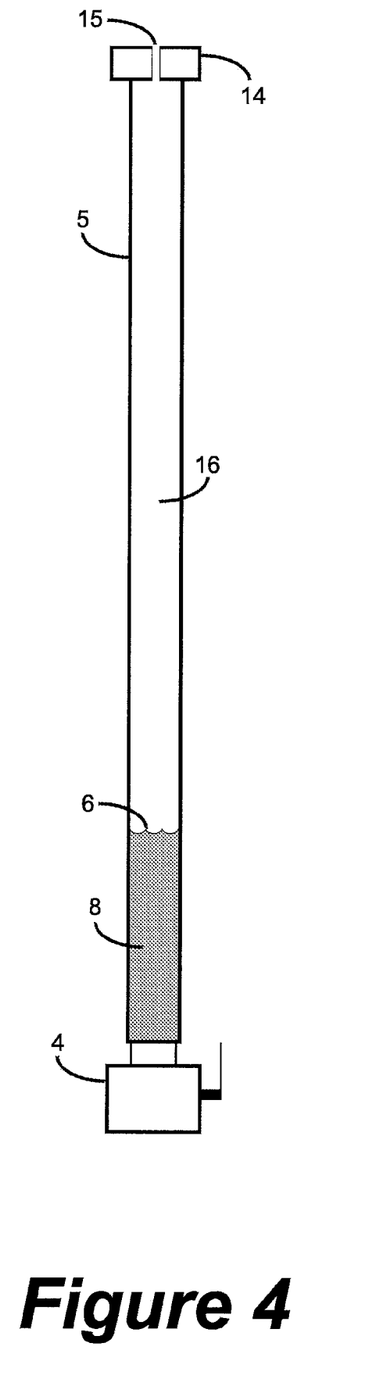
FIG. 4 illustrates one type of filtering used in some embodiments of the present disclosure.

The present disclosure can optionally incorporate filtering to reduce such effects. One filtering technique, used by some embodiments, is to install a cap 14 or other sealed covering on pipe 5 as shown in FIG. 4. (Water level sensors are omitted from FIG. 4 for clarity.) Placing cap 14 on pipe 5 could affect the ability of water to flow freely into and out of the bottom of pipe 5 due to the compression and rarification of the air 16 thus trapped at the top of pipe 5. Therefore, in some embodiments, cap 14 includes a vent 15 that permits the transfer of air at the top of pipe 5.

The diameter, shape, and other characteristics of vent 15 control the rate at which air may transfer. A smaller vent imposes a greater restriction on the rate of transfer, which in turn imposes greater restriction on the rate at which the height of water column 8 can change. The result is a mechanical low pass filter that imposes a damping effect on the oscillations of water column 8 and is just one of many techniques for mechanical filtering made possible by the present disclosure.

An additional benefit of vent 15 in cap 14 is a hard physical limit on the rate at which the water surrounding the hull can inadvertently enter through the draft sensor, should the surrounding water level ever exceed the top of pipe 5.

Some embodiments incorporate filtering at the electronic level within the sensor, such as float mechanism 9 of FIG. 2 or optical sensor 13 of FIG. 3, or within the wake control system or other electronic system to which the present invention is connected. For example, a passive RC filter could be employed using off-the-shelf capacitors and resistors common in the electronics industry. An active filter based on an operational amplifier such as a TLV2471 (Texas Instruments Inc., 12500 Tl Boulevard, Dallas Texas 75243), or another device whose characteristics suit the specifics of the application, could also be used.

Software filtering presents another option in some embodiments of the present disclosure. If the sensor comprises software or firmware, and/or is connected to a system comprising software or firmware, the signal could be filtered using any of a wide variety of corn man software techniques.

All of these filtering approaches are well known to those skilled in the art and may be used individually, or in combination, as suitable for the specific application. Filtering can also optionally be used to introduce intentional nonlinearities into the response of the draft sensor if useful or desirable.

Figure 5:
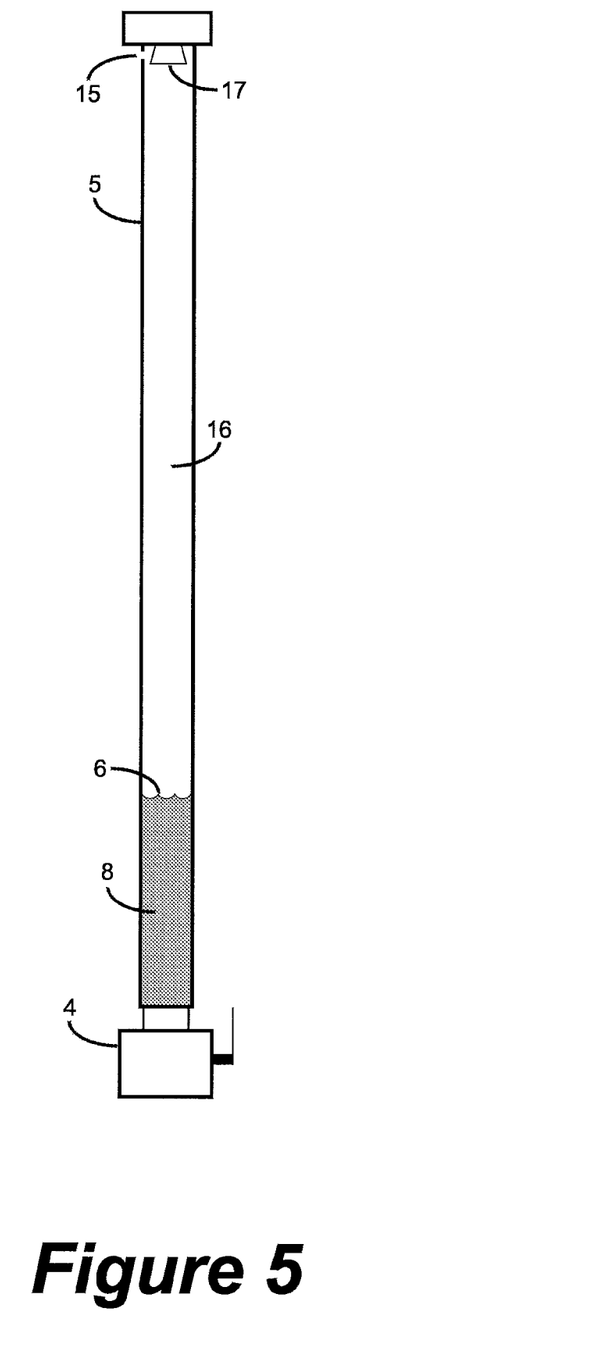
FIG. 5 illustrates one embodiment of the present disclosure depicting ultrasonic measurement of hull draft.

Another sensing method, used by some embodiments, can include an ultrasonic transducer that measures the distance from itself to another object—in the present disclosure, the top of water column 8. Referring to FIG. 5, ultrasonic transducer 17 is attached to the top of pipe 5. The ultrasonic transducer may be, for example, one of the XL-MaxSonar WR/WRC series (MaxBotix Incorporated, 13860 Shawkia Drive, Brainerd MN 56401) or another device that suits the specifics of the application. Vent 15 is optionally present and incorporated into ultrasonic transducer 17, in the side near the top of pipe 5 as illustrated, or another location as suitable for the application.

Ultrasonic transducer 17 measures the distance from itself to the top of water column 8 to determine hull draft. As the height of water column 8 rises with increasing hull draft, its surface draws nearer to ultrasonic transducer 17. Likewise, as the height of water column 8 falls with decreasing hull draft, its surface recedes from ultrasonic transducer 17.

Figure 6:
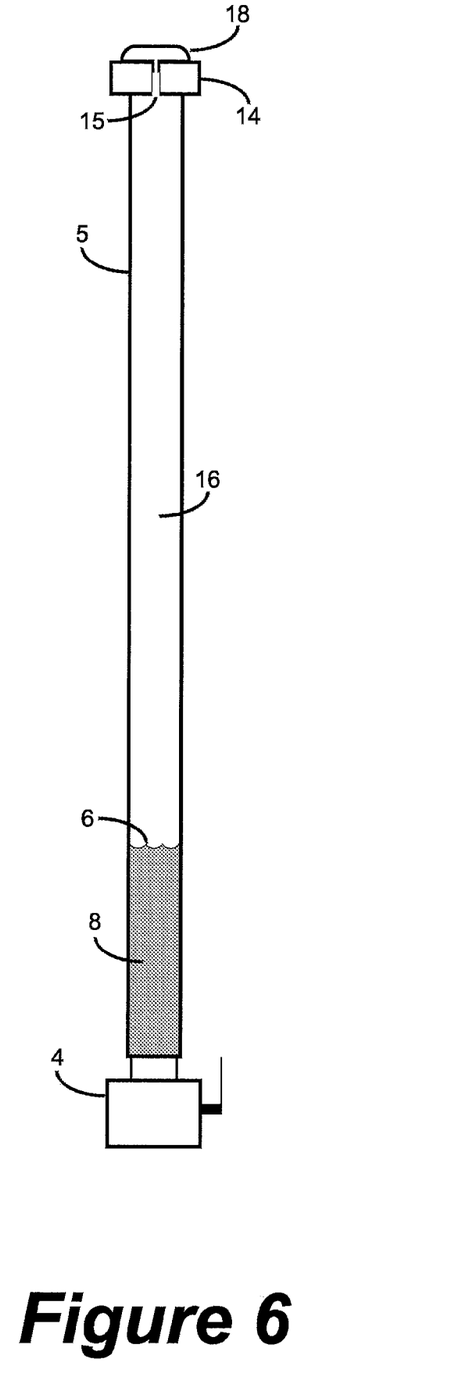
FIG. 6 illustrates one embodiment of the present disclosure depicting air pressure measurement of hull draft.

A further enhancement, delivered by some embodiments of the present disclosure, uses the air trapped by the addition of cap 14 to advantage. Referring to FIG. 6, cap 14 is in place atop pipe 5. A pressure transducer 18 is connected to vent 15 in cap 14, such that pressure transducer 18 can measure the air pressure at the top of pipe 5. Pressure transducer 18 could be, for example, an MPXHZ6400A (Freescale Semiconductor, 1300 North Alma School Road, Chandler AZ 85224) or another device whose characteristics suit the specific application.

As the height of water column 8 increases (due to increased hull draft), the volume occupied by air 16 trapped in the top of pipe 5 will be reduced, resulting in compression and an increase in air pressure. Likewise, as the height of water column 8 decreases (due to decreased hull draft), the volume occupied by air 16 will be increased, resulting in and a decrease in air pressure. Since gases (here, air 16) are compressible and liquids (here, water column 8) are not, all of the pressure changes are experienced by air 16. Pressure changes to air 16 therefore indicate the draft of the hull by indicating the height of water column 8. Pressure transducer 18 measures the pressure of air 16 and, thus, the draft of the hull.

Embodiments of the present disclosure based on that shown in FIG. 6 make it possible to preserve the benefits of the present disclosure's innovations while optionally locating the actual sensor at a remote location. For example, pressure transducer 18 could be connected to cap 14 using hose or tubing. Such an arrangement could allow the purely mechanical components of the present disclosure to be located for their best function and advantage, while the potentially more sensitive pressure transducer 18 could be located in a location more suited to its environmental requirements. This is not meant to imply that any particular type of transducer is overly sensitive. Instead, the flexibility to optionally locate the transducer away from water column 8 itself represents yet another advantage of the present disclosure.

Figure 7:
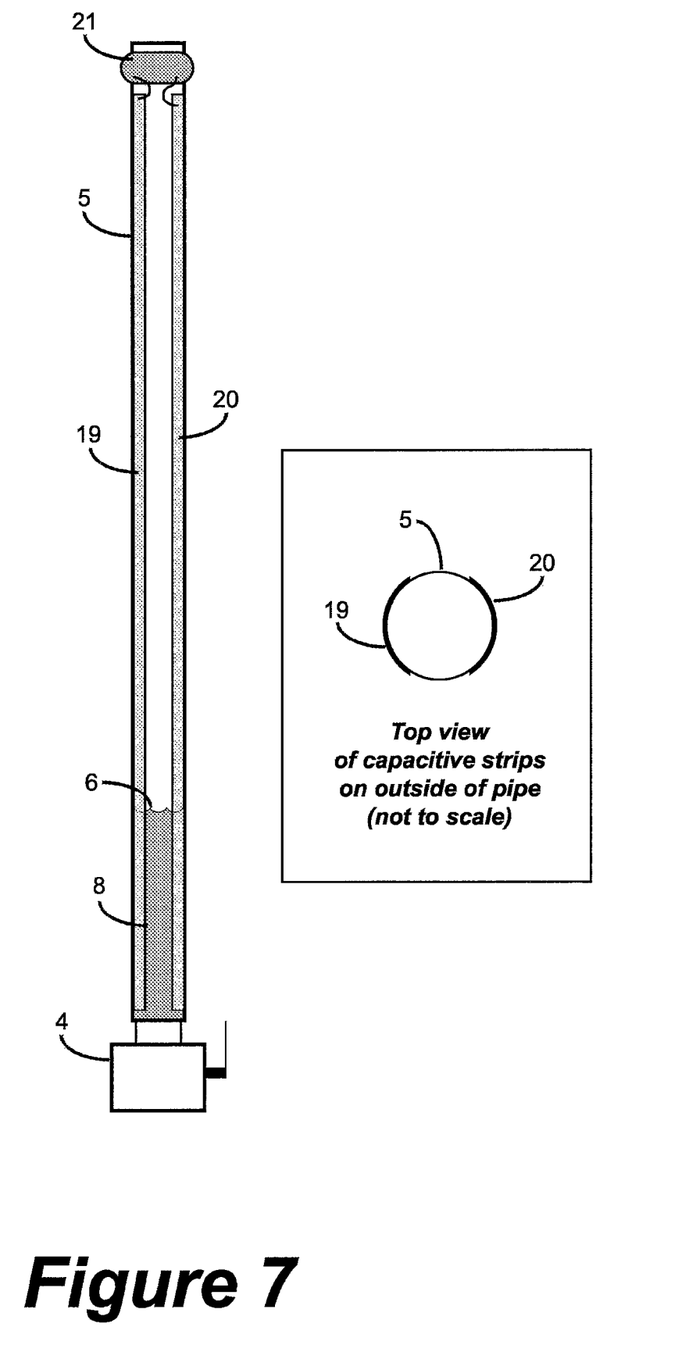
FIG. 7 illustrates one embodiment of the present disclosure depicting capacitive measurement of hull draft.

FIG. 7 illustrates yet another advancement delivered by some embodiments of the present disclosure. Once again valve 4 is connected to pipe 5, allowing the surrounding water to flow in and out of pipe 5. Pipe 5 may be comprised of almost any nonconductive material, for example traditional polyvinyl chloride (PVC) pipe (JM Eagle, 5200 West Century Boulevard, Los Angeles CA 90045) or another material whose characteristics suit the specific application.

Attached to the outside surface of pipe 5, and running substantially along its length, are two conductive strips 19 and 20. These strips can be virtually any conductive material, such as metalized Mylar or another material whose characteristics suit the specific application. Strips 19 and 20 may be attached to pipe 5 using self-adhesive, or held in place by heat shrink tubing, or another attachment technique as suits the specific application. Strips 19 and 20 are installed on opposing sides of pipe 5 and do not contact each other.

In operation, strips 19 and 20 form two plates of a capacitor. Water column 8 acts as a variable dielectric between the capacitor plates formed by strips 19 and 20. As the height of water column 8 within pipe 5 increases and decreases with changes to the hull draft, strips 19 and 20 on the outside of pipe 5 experience increases and decreases in the amount of water present between them. Since water column 8 is acting as a dielectric in the capacitor formed by strips 19 and 20, the varying dielectric causes a varying capacitance across strips 19 and 20.

It is important to note that water column 8 is on the inside of pipe 5 while strips 19 and 20 are on the outside of pipe 5. The water does not contact the strips, instead the water is sensed by the strips through the wall of the pipe. FIG. 7 includes a top view for clarity.

This embodiment of the present disclosure thus creates a variable capacitor whose value is determined by the height of water column 8—or, stated more directly, a variable capacitor whose value indicates the draft of the hull in the surrounding water.

A conversion module 21, electrically connected to strips 19 and 20, converts this varying capacitance to a signal that is compatible with the wake control systems on modern wakeboats. Conversion module 21 may be mounted to the top of pipe 5 as shown, or in any other suitable location compatible with the application. Conversion module 21 can include any of the well-known techniques for converting a capacitance value to a signal; as just one example, a frequency-to-voltage circuit whose oscillation frequency is set by the capacitance in question. It may also comprise an off-the-shelf capacitance-to-voltage module (New Providence Systems, PO Box 2272, Pocatello ID 83206) or another device whose characteristics suit the specific application.

Embodiments of the present disclosure based on that shown in FIG. 7 deliver substantial advantages over existing draft sensors. They are economical, an important consideration in the competitive wakeboat industry. They are rugged and reliable, with no moving parts and no maintenance. Their fabrication can be outsourced to an external vendor, or accomplished in the same factory as the watercraft themselves by employees possessing traditional skills using traditional tools. They can be fabricated and installed primarily using components already familiar to, and commonly used in, the wakeboat industry. If installed with a valve, they can be removed and replaced while the watercraft remains in the water using traditional tools. They are physically compatible with any current or future hull material. They are electrically compatible with modern wake control systems and can be made compatible with the signal requirements of future wake control systems. Embodiments of the present disclosure such as that shown in FIG. 7 represent significant advancements in the art.

As with other embodiments of the present disclosure, those based on capacitance sensing as illustrated in FIG. 7 can take advantage of the mechanical, electrical, software, and firmware filtering techniques described above as suited to the specifics of a given application.

Additional adaptability may be realized by adjusting strips 19 and 20 in length, width, and positioning to suit a given application. The minimum and maximum capacitance values from such embodiments of the present disclosure are related to such parameters as the surface area of strips 19 and 20, and the material and diameter and length and wall thickness of pipe 5. Given a preferred choice of characteristics for other components, the length and width and positioning of strips 19 and 20 can be easily adjusted to yield the best range of capacitance values.

As one example, an embodiment of the present disclosure that benefits from a shorter pipe 5 would thus place a restriction on the maximum lengths of strips 19 and 20. To offset this loss of surface area (and thus capacitance), the widths of strips 19 and 20 could be increased accordingly.

As the widths of strips 19 and 20 increase, their side edges will "wrap around" pipe 5 and begin to approach each other, leading to undesired parasitic capacitance between the strips themselves. This difficulty is easily ameliorated by increasing the diameter of pipe 5, thus causing the combined widths of strips 19 and 20 to represent a smaller percentage of pipe 5's total circumference and causing the edges of strips 19 and 20 to draw away from each other as larger pipe diameters are used and the circumferential spacing between strips 19 and 20 increases accordingly.

As another example, an embodiment of the present disclosure that uses a longer pipe 5 would accommodate longer lengths of strips 19 and 20. As a result, the widths of strips 19 and 20 could potentially be reduced. This in turn may enable the use of a smaller diameter pipe 5, if desired.

As yet another embodiment represented by the present disclosure, it is possible to accommodate nonlinearities by shaping of strips 19 and 20. Presuming strips 19 and 20 are rectangular in shape, a linear relationship will exist between the height of water column 8 and the resulting capacitance value because the combined "active" surface area of strips 19 and 20 will increase or decrease linearly as water column 8 increases or decreases in height. However, if hull shape or other considerations cause a nonlinear relationship between the height of water column 8 and the actual draft of the hull, the widths of strips 19 and 20 may be varied along their length to introduce intentional nonlinearity of the draft sensor's response, which can then be combined with the undesirable nonlinearity to yield a linear response.

In some embodiments of the present disclosure, this ability can be used when nonlinearity is desired, or even to achieve completely arbitrary response curves.

Figure 8:
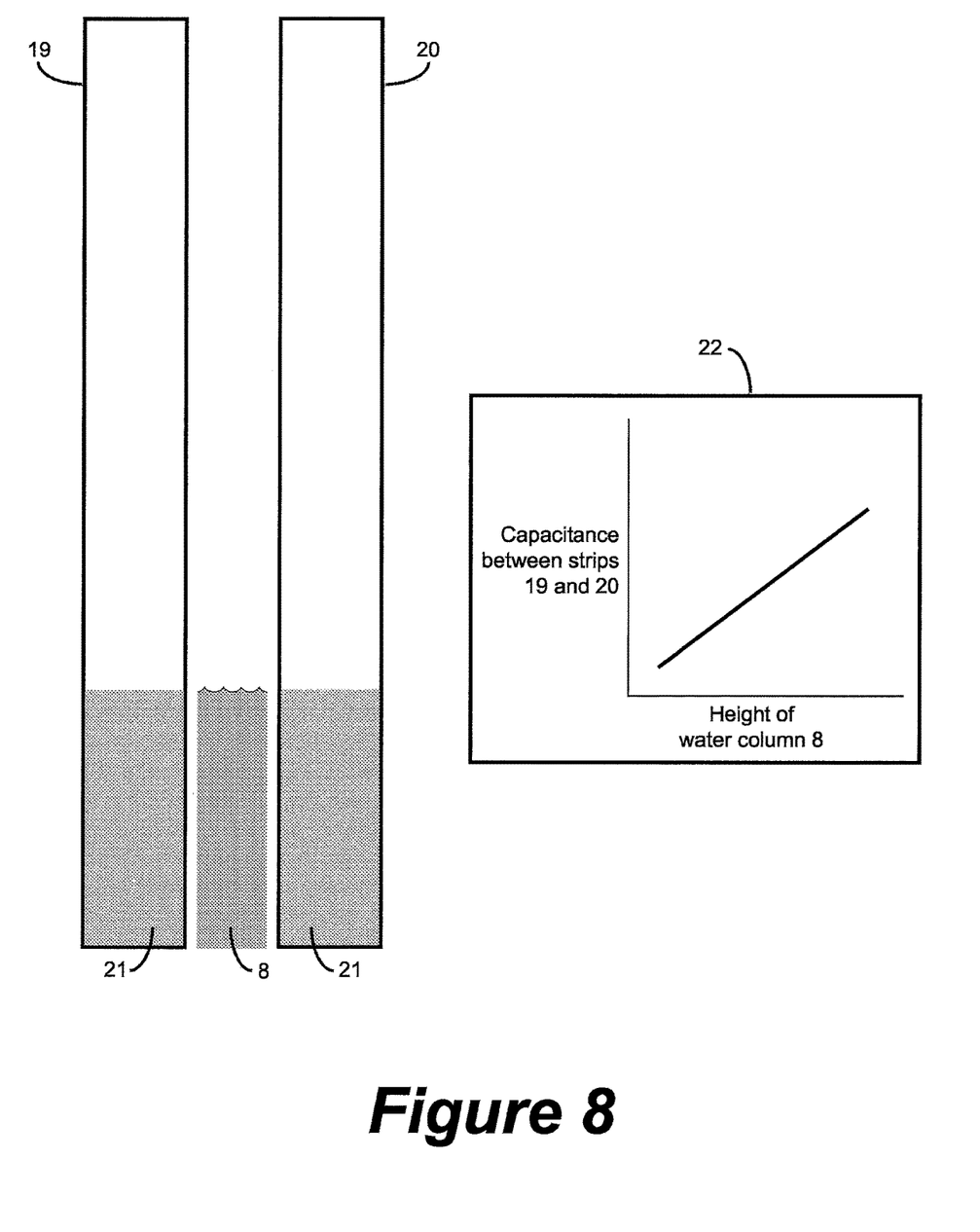
FIG. 8 illustrates one example of how capacitive strip shape affects the resulting relationship between hull draft and capacitance.

Consider strips 19 and 20 of FIG. 8, shown "flat" before installation on pipe 5 for clarity of illustration. Water column 8 is illustrated "between" the strips. As water column 8 rises, it increases the active surface area 21 (shaded for clarity) of strips 19 and 20 in a linear manner due to the rectangular shape of the strips. Expressed differently, doubling the height of water column 8 doubles active surface area 21. In such embodiments, this results in a linear relationship between the height of water column 8 and the capacitance across strips 19 and 20. The curve of graph 22 illustrates such a linear (straight-line) relationship.

Figure 9:
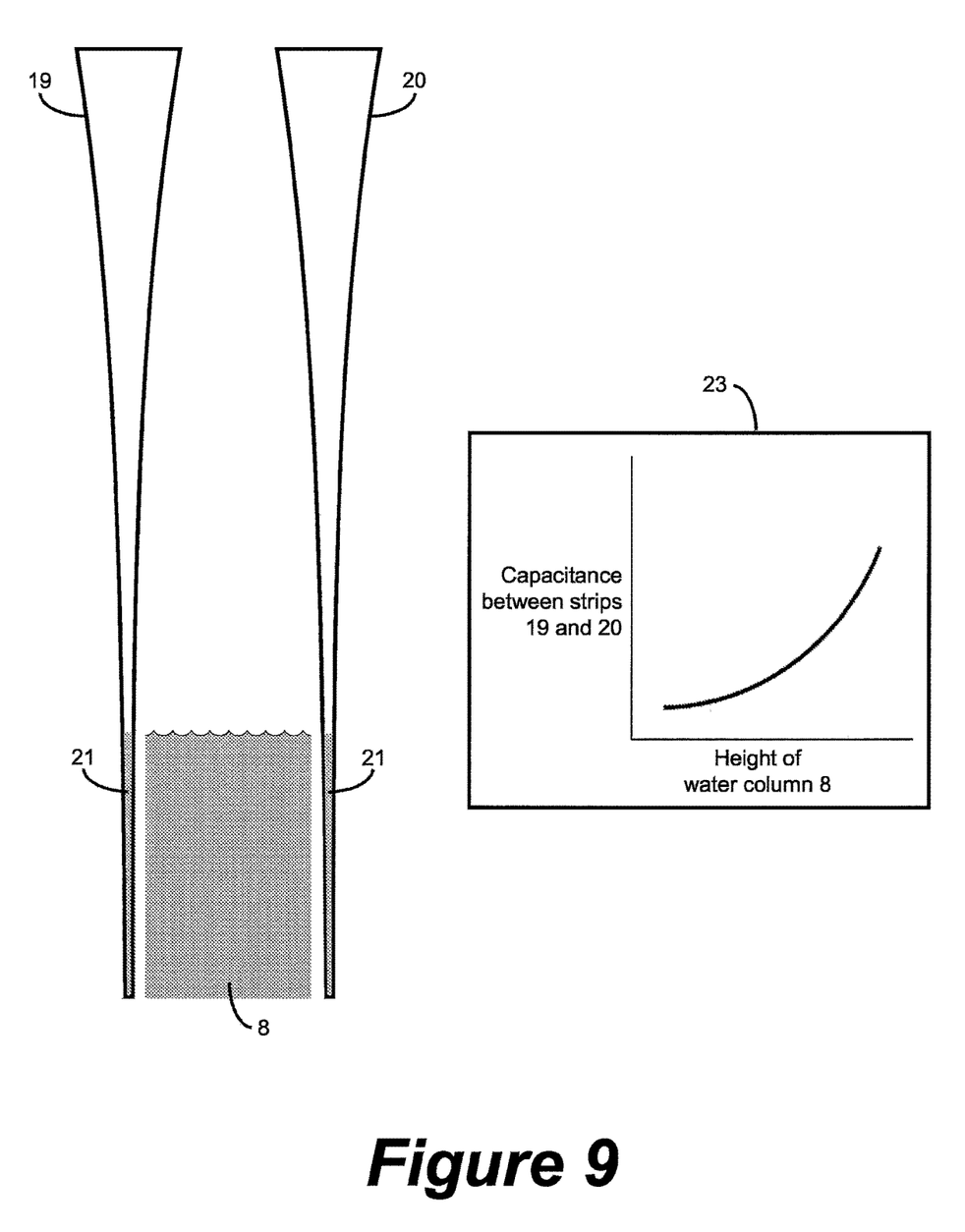
FIG. 9 illustrates another example of how capacitive strip shape affects the resulting relationship between hull draft and capacitance.

Alternatively, consider strips 19 and 0 of FIG. 9 which taper from narrow at the bottom to wide at the top. The percentage of active surface area 21 of strips 19 and 20 increases faster than the percentage increase of water column 8's height as the latter rises. Stated another way, doubling the height of water column 8 more than doubles active surface area 21. The curve of graph 23 illustrates the resulting, nonlinear relationship between height and capacitance—and, more importantly, between hull draft and capacitance.

From FIGS. 8 and 9 some embodiments of the present disclosure provide the ability to alter the response curve through simple reshaping of strips 19 and 20. Identical components can be shared between multiple versions of draft measuring systems, yet their response curves can be made dramatically different as necessary by simple trimming of strips 19 and 20 before their assembly to pipe 5. Such customization of response curves—known as "curve fitting" in the electronics and other industries—is at least one advantage of the present disclosure.

In fact, this customized curve fitting is not limited to just pre-assembly. Adjustment of strips 19 and 20 can be performed after assembly, during in-hull testing, or even as in-the-field calibration for especially precise applications. Strips 19 and 20 can be fabricated of metalized Mylar, metallic foil, or other materials that allow trimming to shape after application, with the undesired material then peeled away or otherwise removed. This allows some embodiments to be calibrated after assembly and installation into their final points of use-yet another dramatic and substantial advancement of the art.

The present disclosure supports a variety of output signal types. In some embodiments, the output signal may be an analog voltage which duplicates that of one or more traditional marine draft sensors. Alternatively, an analog voltage may be produced to be compatible with a given wake control system's input specifications. In other embodiments, the output signal may be a digital data stream whose format is proprietary, or based on a standard such as Controller Area Network (CAN) or Ethernet, or another format as suits the specific application. From the foregoing, the present disclosure is not limited to any specific type of output signal and the type and format of that signal can be updated as new requirements or industry standards appear.

In some embodiments the present invention's indication of hull draft can be absolute, or relative to some offset either fixed or configurable, as suits the application. Units of measure can be based on standards including but not limited to metric or Imperial, or even arbitrary units specific to a given installation.

Furthermore, it is not necessary for pipe 5 to be comprised of actual pipe. A compartment of any type suitable to the specifics of the application may be used. However, many styles of pipe are inherently compatible with water-based installations, and the wide range of fittings and other accessories available for piping products makes pipe a straightforward choice in many embodiments.

The present disclosure supports significant mechanical adaptability. For example, the length and diameter of pipe 5 can be varied to suit the specifics of a given application. A watercraft that naturally has deeper hull draft, or one that experiences greater variation in its draft during operation, may benefit from a longer pipe 5 to insure that the top of pipe 5 always remains above the surface of the surrounding water. The diameter of pipe 5, its wall thickness, its material, and other attributes may also be varied based on installation or other considerations. Different hull mounting styles may be accommodated. This ability to be realized in a variety of form factors, using differing components and materials, is a key advantage of the present disclosure and a significant advancement of the art.

In summary, the draft measuring system disclosed herein may comprise several alternative components. At a minimum the system includes a hole through the hull of the wakeboat. The hole is positioned below the operational waterline of the hull. Located within the hole is a fitting. The fitting may have any suitable profile on the exterior of the hull including but not limited to a mushroom style, a seacock style or a flush mount. An open pipe is attached to the fitting. Preferably, the pipe has a length greater than the greatest expected draft of the hull. Additionally, a shut-off valve is preferably included as an integral part of the fitting, an integral part of the pipe or a separate component located either between the pipe and the fitting or at the end of the pipe. Carried by the pipe is any one of or a combination of draft measuring systems. Suitable draft measuring systems include:

a float that measures the column of water within the pipe and incorporates appropriate electronics to transmit a signal to the wake control system;

optical emitters with compatible receptors, i.e. photodiodes or phototransistors;

light sensors suitable for detecting a change in color within the pipe;

light sensors suitable for monitoring a change in refraction of light passing through the pipe;

an ultrasonic transducer positioned to monitor the water level within the pipe;

a pressure transducer positioned within a cap attached to the end of the pipe;

conductive strips carried by the exterior of the pipe and a conversion module suitable to detect changes in capacitance between the conductive strip resulting from changes in water level within the pipe.

One skilled in the art will appreciate that the pipe used in connection with the optical emitters and light sensors should be optically transparent. Additionally, one skilled in the art will recognize that the pipe used in connection with the conductive strips must be non-conductive in order to permit the development of a capacitive change between the strips. Finally, the draft measuring system may optionally include a filtering mechanism to eliminate changes in water volume within the pipe resulting from external environmental conditions not associated with the operation of the wakeboat, e.g. wind driven waves. Such filtering mechanism may include a vent within a cap carried by the open end of the pipe, a low pass mechanical filter, a passive RC filter, an active amplifying filter and/or software within the onboard wake control system.

The above described wake control system is particularly suited for accurately reproducing wakes behind wakeboats. The method of using the wake control system begins with fitting a draft measuring system, as described above, to the hull of a wakeboat. The wakeboat will have at least one trim tab and at least one ballast tank controlled by the onboard wake control system. Typically, the wakeboat will have a plurality of trim tabs and ballast tanks. When a surfer is behind the wakeboat, the trim tabs and ballast tanks will be adjusted until the surfer is satisfied with the wake. This first wake is then stored within the memory of the onboard wake control system. The stored data includes information produced by the draft measuring system which reflects the draft of the wakeboat corresponding to the desired wake. As discussed above, the draft measuring system includes a filtering mechanism which enhances the accuracy of the stored wake by substantially eliminating minor changes in draft resulting from the choppiness of the water surface.

Upon completion of the surfer's turn behind the boat, the configuration of the wake will be available for future use. Subsequently, the surfer returns for another turn surfing the wake behind the wakeboat. However, onboard conditions such as passenger load, cargo load, passenger position, cargo position or other onboard variables have changed. The onboard wake control system will compensate for the changes in onboard variables by recalling the stored profile including the data provided by the draft measuring system. The onboard wake control system will then adjust the trim tabs and ballast tanks to achieve an input from the draft measuring system corresponding to the draft reflecting the stored first wake.

In compliance with the statute, embodiments of the disclosure have been described in language more or less specific as to structural and methodical features. It is to be understood, however, that the entire invention is not limited to the specific features and/or embodiments shown and/or described, since the disclosed embodiments comprise forms of putting the invention into effect.

What is claimed is:

1. A wake control system for a wakeboat having a hull, said system comprising:

an opening in the hull, said opening in the hull located below the operational waterline of the hull;

a tube in communication with said opening providing fluid communication between the exterior and interior of the hull;

a shutoff valve positioned between said open tube and said opening in said hull; and a draft measuring system in fluid communication with said shutoff valve.

2. The wake control system of claim 1, wherein said draft measuring system is selected from the group consisting of: a float configured to measure a water column within said tube; an ultrasonic transducer positioned at the top of said tube to measure the water column within said tube; a cap positioned on top of said tube, said cap carrying a pressure transducer; a pressure transducer fitted to said shutoff valve.

3. The wake control system of claim 1, wherein said draft measuring system comprises an optical sensor selected from the group of: at least one optical emitter paired with at least one optical receptor; or, an optical emitter paired with at least one light sensor capable of detecting shifts in color or refraction; and wherein said tube is optically transparent to light produced by said optical emitter.

4. The wake control system of claim 1, further comprising a filter configured to minimize the effects of oscillations of water level within said tube.

5. The wake control system of claim 4, wherein said filter is a vented cap covering the top of said tube.

6. The wake control system of claim 4, wherein said filter is a mechanical low pass filter that imposes a damping effect on the oscillations of water within said tube.

7. The wake control system of claim 4, wherein said draft measuring system is selected from the group consisting of: a float configured to measure a water column within said tube; an ultrasonic transducer positioned at the top of said tube to measure the water column within said tube; a cap positioned on top of said tube, said cap carrying a pressure transducer; a pressure transducer fitted to said shutoff valve; and, wherein said filter is an RC filter electrically coupled with said draft measuring system, said RC filter configured to filter a signal produced by said draft measuring system prior to said signal being received by said wake control system.

8. The wake control system of claim 4, wherein said draft measuring system is selected from the group consisting of: a float configured to measure a water column within said tube; an ultrasonic transducer positioned at the top of said tube to measure the water column within said tube; a cap positioned on top of said tube, said cap carrying a pressure transducer; a pressure transducer fitted to said shutoff valve; and, wherein said filter is an active amplifying filter electrically coupled with said draft measuring system, said amplifying filter configured to filter a signal produced by said draft measuring system prior to said signal being received by said wake control system.

9. The wake control system of claim 4, wherein said draft measuring system is selected from the group consisting of: a float configured to measure a water column within said tube; an ultrasonic transducer positioned at the top of said tube to measure the water column within said tube; a cap positioned on top of said tube, said cap carrying a pressure transducer; and, wherein said wake control system includes filtering software configured to cancel the effects of oscillations of water level within said tube.

10. The wake control system of claim 4, wherein said draft measuring system is an optical sensor selected from the group consisting of: at least one optical emitter paired with at least one optical receptor; or, an optical emitter paired with at least one light sensor capable of detecting shifts in color or refraction;

wherein said tube is optically transparent to light produced by said optical emitter; and, wherein said filter is an RC filter electrically coupled with said draft measuring system, said RC filter configured to filter a signal produced by said draft measuring system prior to said signal being received by said wake control system.

11. The wake control system of claim 4, wherein said draft measuring system is an optical sensor selected from the group consisting of: at least one optical emitter paired with at least one optical receptor; or, an optical emitter paired with at least one light sensor capable of detecting shifts in color or refraction;

wherein said tube is optically transparent to light produced by said optical emitter; and, wherein said filter is an active amplifying filter electrically coupled with said draft measuring system, said amplifying filter configured to filter a signal produced by said draft measuring system prior to said signal being received by said wake control system.

12. The wake control system of claim 4, wherein said draft measuring system is an optical sensor selected from the group consisting of: at least one optical emitter paired with at least one optical receptor; or, an optical emitter paired with at least one light sensor capable of detecting shifts in color or refraction;

wherein said tube is optically transparent to light produced by said optical emitter; and, wherein said wake control system includes filtering software configured to cancel the effects of oscillations of water level within said tube.

13. A wake control system for a wakeboat having a hull, said system comprising:

an opening in the hull, said opening in the hull located below the operational waterline of the hull;

an open tube in communication with said opening providing fluid communication between the exterior and interior of the hull;

a cap positioned on top of said open tube;

a draft measuring system in fluid communication with said open tube, said draft measuring system comprising a pressure transducer configured to measure water pressure within said tube, said draft measuring system capable of generating a signal representative of the volume of water within said tube, said signal received and stored by said wake control system;

a shutoff valve positioned between said open tube and said fitting; and the wake control system configured to control a wake generated from operation of said wakeboat.

14. The wake control system of claim 13, further comprising a filter configured to minimize the effects of oscillations of water level within said tube.

15. The wake control system of claim 14, wherein said filter is a vent within said cap.

16. The wake control system of claim 14, wherein said filter is a mechanical low pass filter that imposes a damping effect on the oscillations of water within said tube.

17. The wake control system of claim 14, wherein said filter is an RC filter electrically coupled with said pressure transducer, said RC filter configured to filter the signal produced by said pressure transducer prior to said signal being received by said wake control system.

18. The wake control system of claim 14, wherein said filter is an active amplifying filter electrically coupled with said pressure transducer said amplifying filter configured to filter the signal produced by said pressure transducer prior to said signal being received by said wake control system.

19. The wake control system of claim 14, wherein said wake control system includes filtering software configured to cancel the effects of oscillations of water level within said tube.

20. A wake control system for a wakeboat having a hull, said system comprising:
    an opening in the hull, said opening in the hull located below the operational waterline of the hull;
    a draft measuring system in fluid communication with said opening in said hull, said draft measuring system capable of generating a signal, and the draft measuring system selected from the group consisting of an ultrasonic transducer and a pressure transducer; and
    the wake control system configured to control a wake generated from operation of said wakeboat.

21. The wake control system of claim 20, wherein said draft measuring system further comprises a tube and a filter configured to minimize the effects of oscillations of water level within said tube.

22. The wake control system of claim 21, wherein said filter is a mechanical low pass filter that imposes a damping effect on the oscillations of water within said tube.

23. The wake control system of claim 20, further comprising a shutoff valve;
    said draft measuring system is a pressure sensor in fluid communication with said shutoff valve; and,
    a tube in fluid communication with said shutoff valve.

24. The wake control system of claim 23, further comprising a cap positioned on said tube.

25. A method for reproducing a wake behind a wakeboat comprising:
    providing a wakeboat;
    establishing a first wake behind said wakeboat;
    measuring the draft of the hull using said draft measuring system, said draft measuring system generating a signal representative of the measured draft;
    transmitting the signal representative of the measured draft to said onboard wake control system;
    storing the value of said measured draft in said onboard wake control system;
    changing at least one of the following variables: number of passengers on said wakeboat, the weight of all passengers on said wakeboat, the weight of cargo on said wakeboat, the position of passengers on said wakeboat, the position of cargo on said wakeboat;
    following the change in at least one of the variables, using said draft measuring system and said wake control system to reproduce said first wake.

26. The method of claim 25, further comprising the step of filtering the signal generated by said draft measuring system to reduce the effect of water surface oscillations experienced by said draft measuring system.

27. A method for reproducing a wake behind a wakeboat comprising:
    providing a wakeboat;
    establishing a first wake behind said wakeboat;
    measuring the draft of the hull using said draft measuring system, said draft measuring system generating a signal representative of the measured draft;
    transmitting the signal representative of the measured draft to said onboard wake control system;
    changing at least one of the following variables: number of passengers on said wakeboat, the weight of all passengers on said wakeboat, the weight of cargo on said wakeboat, the position of passengers on said wakeboat, the position of cargo on said wakeboat;
    following the change in at least one of the variables, using said draft measuring system and said wake control system to reproduce said first wake.

28. The method of claim 27, further comprising the step of filtering the signal generated by said draft measuring system to reduce the effect of water surface oscillations experienced by said draft measuring system.

\* \* \* \* \*